United States Patent
Iwase

(10) Patent No.: US 11,451,542 B2
(45) Date of Patent: Sep. 20, 2022

(54) MANAGEMENT APPARATUS AND CONTROL METHOD FOR SAME

(71) Applicant: CANON KABUSHIKI KAISHA, Tokyo (JP)

(72) Inventor: Hajime Iwase, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 16/744,239

(22) Filed: Jan. 16, 2020

(65) Prior Publication Data
US 2020/0244657 A1 Jul. 30, 2020

(30) Foreign Application Priority Data
Jan. 28, 2019 (JP) .............................. JP2019-012454

(51) Int. Cl.
*H04L 9/40* (2022.01)
(52) U.S. Cl.
CPC ........ *H04L 63/0876* (2013.01); *H04L 63/102* (2013.01)
(58) Field of Classification Search
CPC . H04L 63/0876; H04L 63/102; H04L 63/101; H04L 63/104
See application file for complete search history.

(56) References Cited

U.S. PATENT DOCUMENTS

| 2013/0007891 | A1* | 1/2013 | Mogaki ................. | H04L 63/104 726/27 |
| 2019/0081943 | A1* | 3/2019 | Yamanakajima ..... | H04L 63/083 |
| 2019/0200226 | A1* | 6/2019 | Leguillon ........... | H04L 63/0876 |

FOREIGN PATENT DOCUMENTS

JP 2018032088 A 3/2018

* cited by examiner

*Primary Examiner* — Khoi V Le
(74) *Attorney, Agent, or Firm* — Rossi, Kimms & McDowell LLP

(57) ABSTRACT

A management apparatus managing access authority of a communication apparatus to access a resource, the management apparatus receives an authorization request for the access authority; transmits an authorization response generated based on information included in the authorization request; receives a verification request from a communication terminal obtained an operation transfer from the communication apparatus; transmits verification data to the communication terminal as a response to the verification request; accepts access by the communication terminal based on the verification data; and determines whether to permit or reject allocation of the access authority to the communication apparatus. In a case where a plurality of the verification requests are received, the verification data enabling collective instruction to allocate the access authority is transmit.

12 Claims, 11 Drawing Sheets

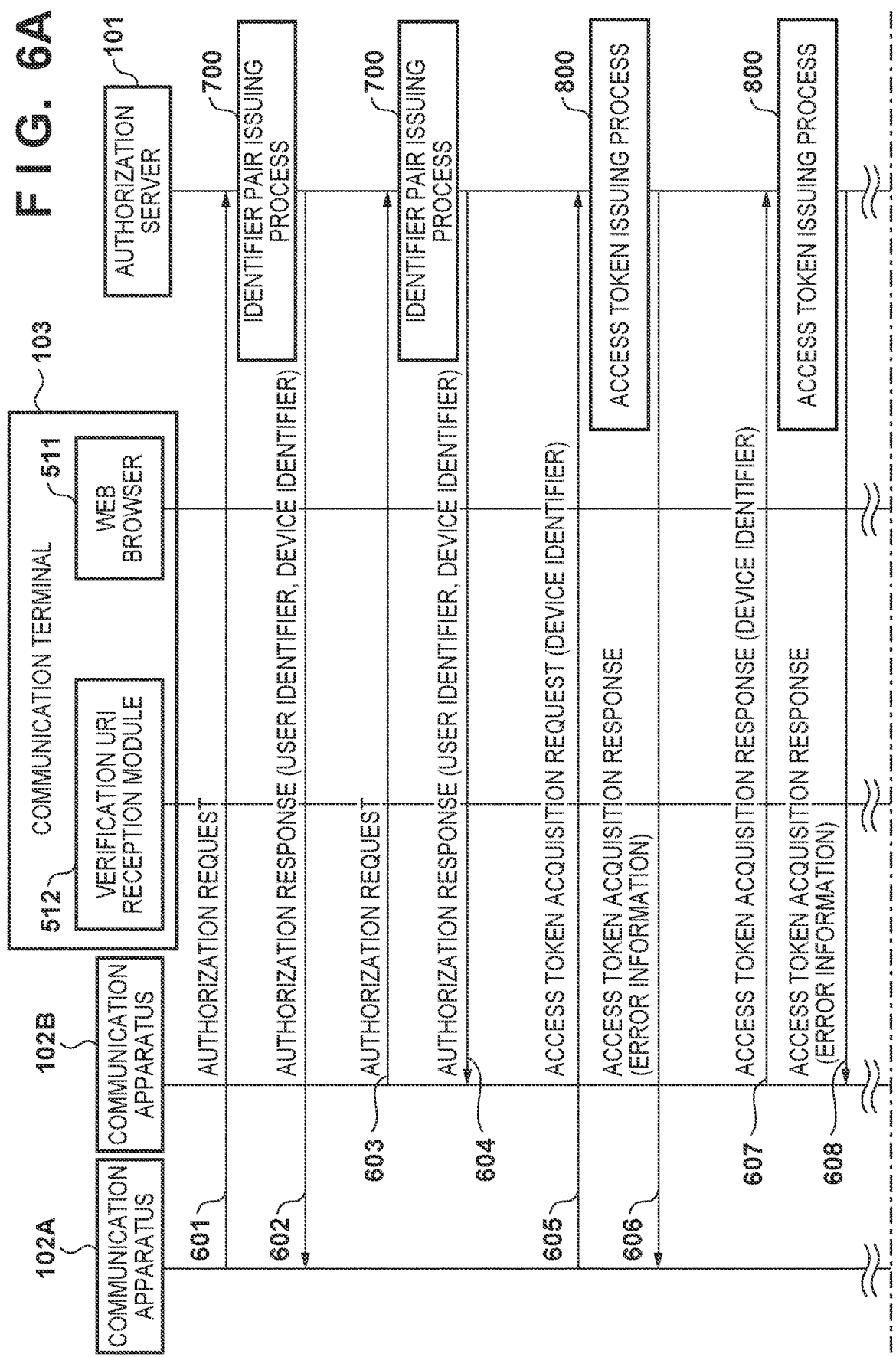

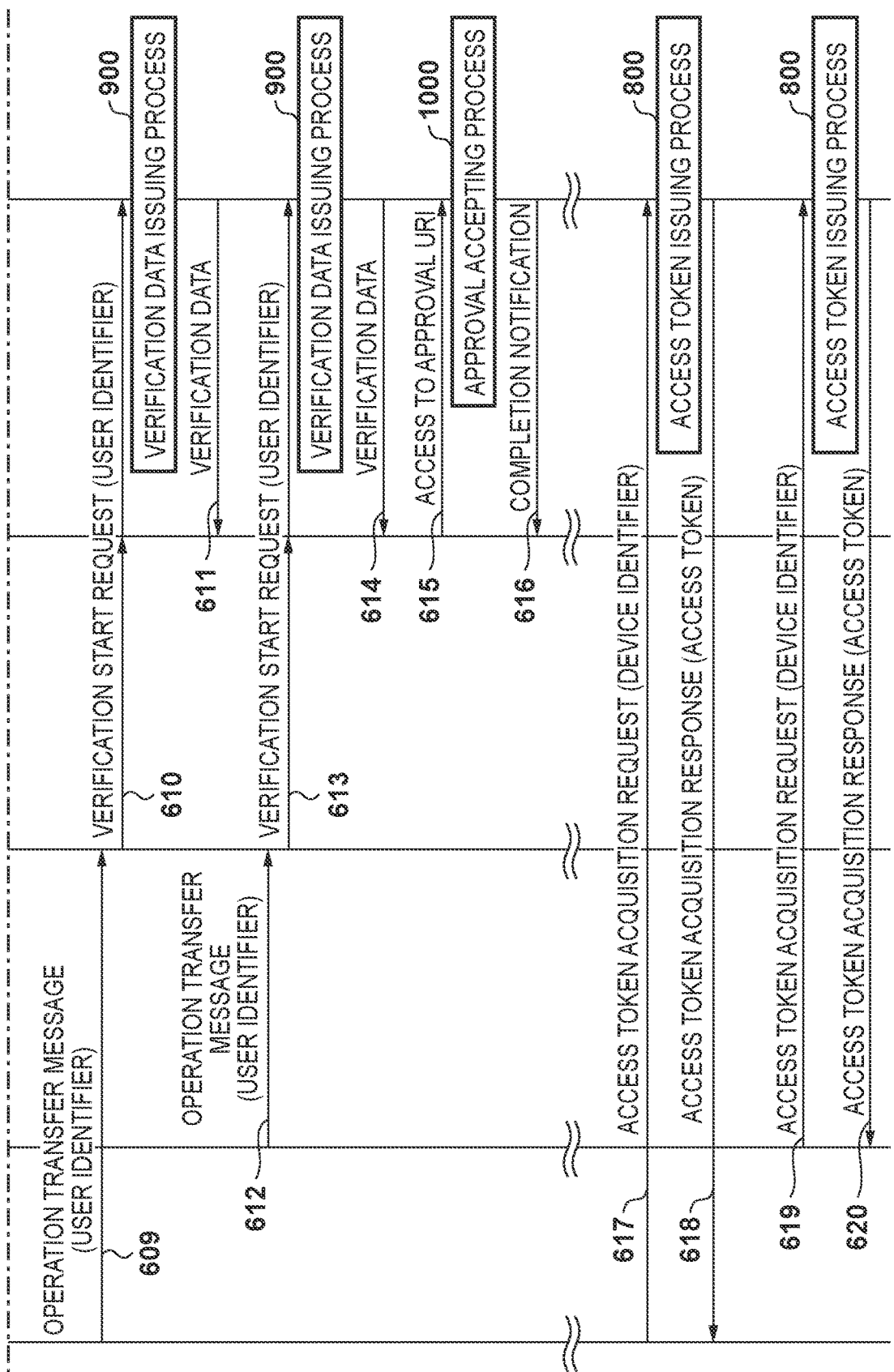

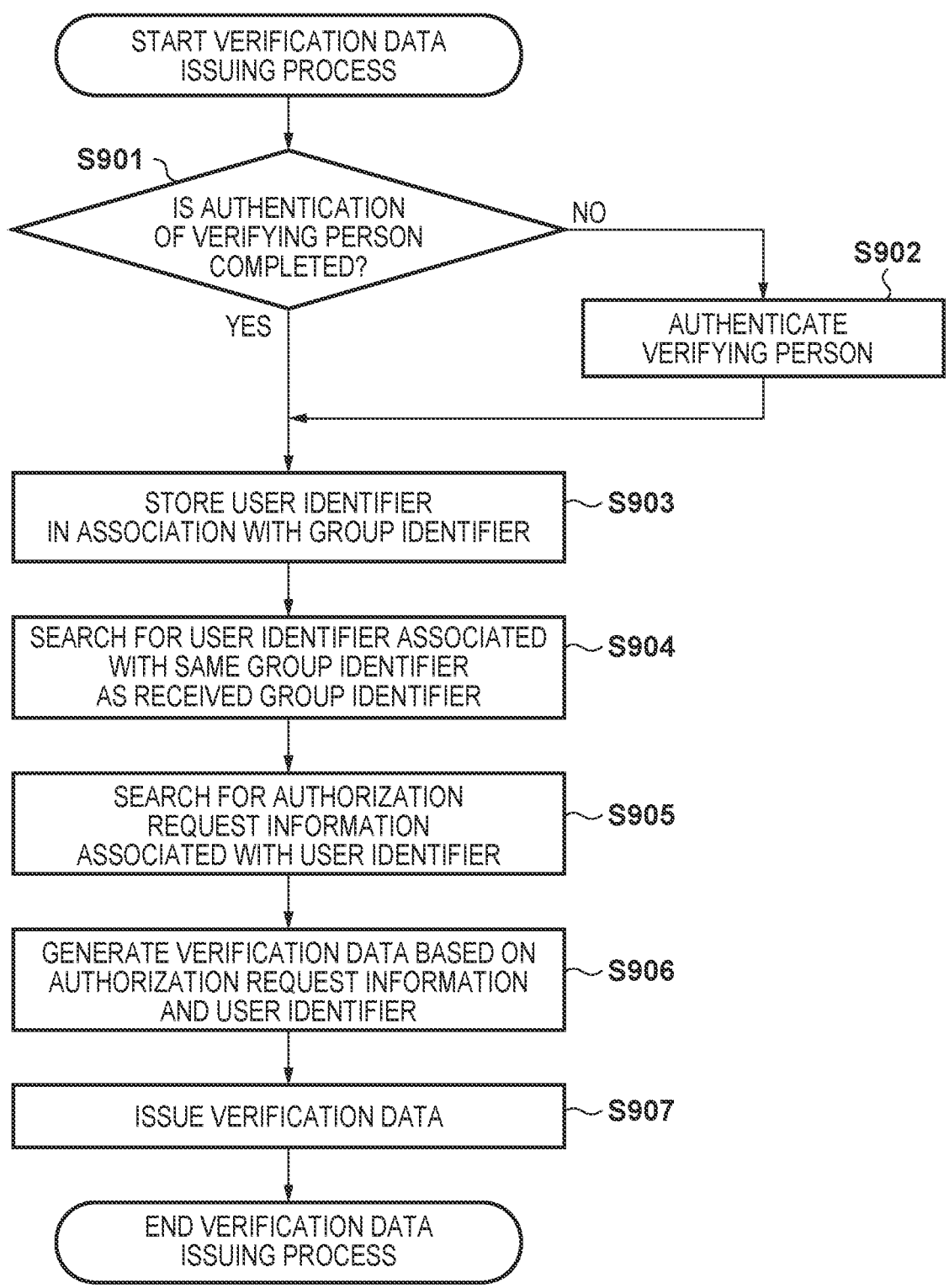

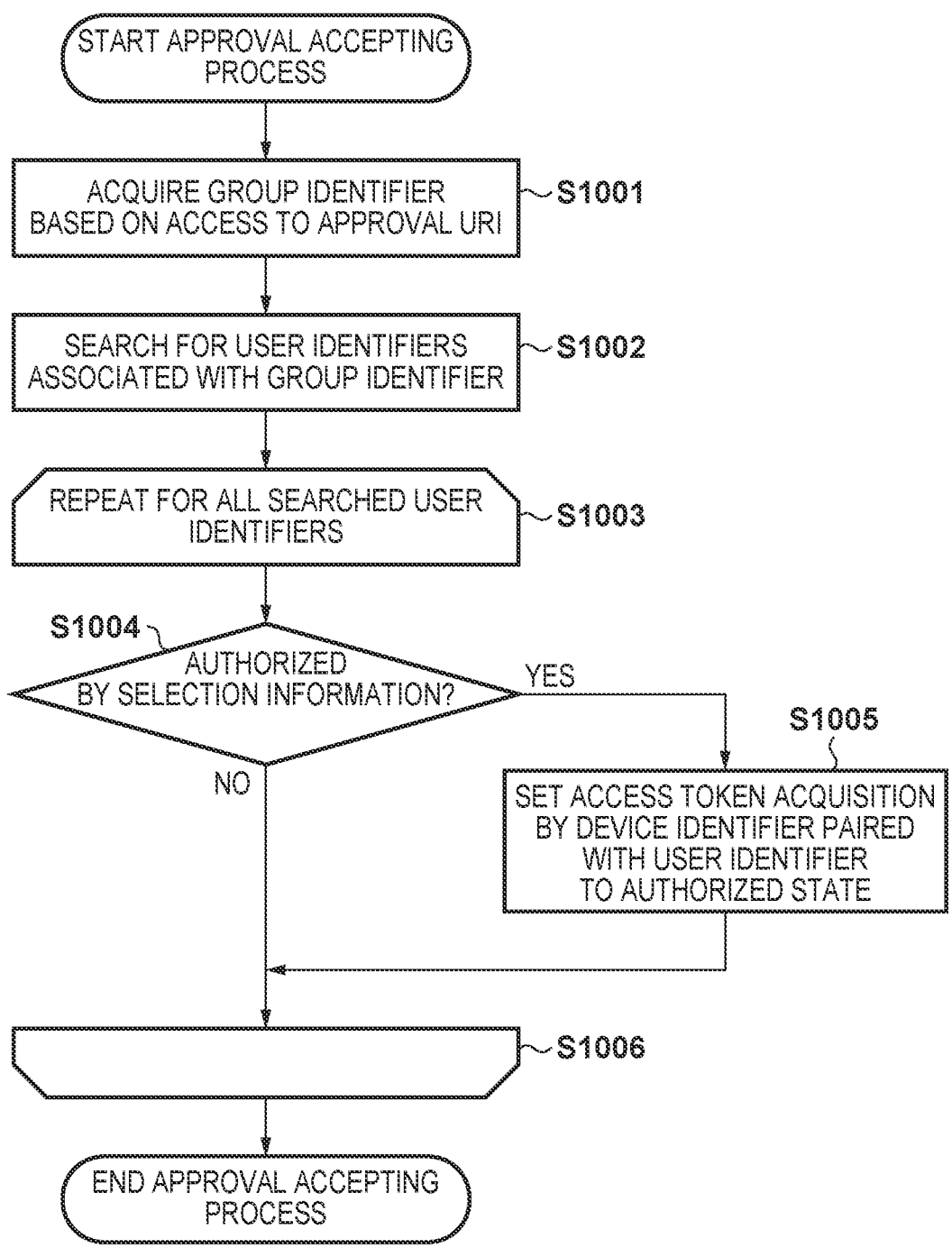

F I G. 12

| AUTHORIZATION REQUEST PERSON | AUTHORIZATION REQUEST RANGE | DEVICE IDENTIFIER | USER IDENTIFIER | AUTHORIZATION FOR ACCESS TOKEN ISSUANCE |
|---|---|---|---|---|
| Camera001 | Upload Browse | DeviceCode001 | UserCode001 | No |
| Camera002 | Upload | DeviceCode002 | UserCode002 | No |
| ... | ... | ... | ... | ... |

F I G. 13

| GROUP IDENTIFIER | USER IDENTIFIER |
|---|---|
| User A | UserCode001 |
| User A | UserCode002 |
| ... | ... |

MANAGEMENT APPARATUS AND CONTROL METHOD FOR SAME

BACKGROUND OF THE INVENTION

Field of the Invention

The present invention relates to a resource access authority allocation technology.

Description of the Related Art

In recent years, communication apparatuses such as smart devices and digital cameras have been equipped with a network connecting function to cooperate with services on the web. In a case where a communication apparatus is caused to access a resource on a web service, a user needs to allocate, to the communication apparatus, access authority to access the resource.

OAuth2.0 is known as a technology for allocating authorization information representing access authority to access a resource. Japanese Patent Laid-Open No. 2018-32088 discloses an authority allocation system utilizing OAuth2.0. More specifically, a method is disclosed in which the management apparatus managing authorization information acquires an approval instruction based on user operation via a user interface of a communication terminal, and the management apparatus allocates the authorization information to the communication apparatus. On the other hand, a communication apparatus with only a low-performance user interface is disadvantageously not configured to provide an approval instruction based on user operation. In contrast, a method has been proposed that utilizes a proxy device different to the communication apparatus to acquire an approval instruction from a user.

However, the foregoing conventional technology does not consider collective allocation of authorization information to a plurality of communication apparatuses. Thus, in a case where authorization information is allocated to multiple communication apparatuses, it was inefficient for the user to provide an approval instruction to each of the communication apparatuses.

SUMMARY OF THE INVENTION

According to one aspect of the present invention, a management apparatus managing access authority of a communication apparatus to access a resource, the management apparatus comprises: a first reception unit configured to receive an authorization request for the access authority from the communication apparatus; a first transmission unit configured to transmit an authorization response generated based on information included in the authorization request, the authorization response including a device identifier and a user identifier; a second reception unit configured to receive a verification request including the user identifier from a communication terminal notified of the user identifier and obtained an operation transfer from the communication apparatus; a second transmission unit configured to transmit verification data to the communication terminal as a response to the verification request; an acceptance unit configured to accept access by the communication terminal based on the verification data; and a determination unit configured to determine whether to permit or reject allocation of the access authority to the communication apparatus based on acceptance of the access in the acceptance unit, wherein in a case where the second reception unit receives a plurality of the verification requests from the communication terminal, the second transmission unit transmits, to the communication terminal, the verification data enabling collective instruction to allocate the access authority to a plurality of the communication apparatuses corresponding to the respective plurality of the verification requests.

The present invention enables the access authority to be efficiently allocated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are a sequence diagram illustrating an example of processing related to access token issuance.

FIG. 9 is a flowchart of a verification data issuing process.

FIG. 10 is a flowchart of an approval accepting process.

FIG. 12 is a diagram illustrating an example of an authorization request table.

FIG. 13 is a diagram illustrating an example of a grouping table.

DESCRIPTION OF THE EMBODIMENTS

Figure 1:
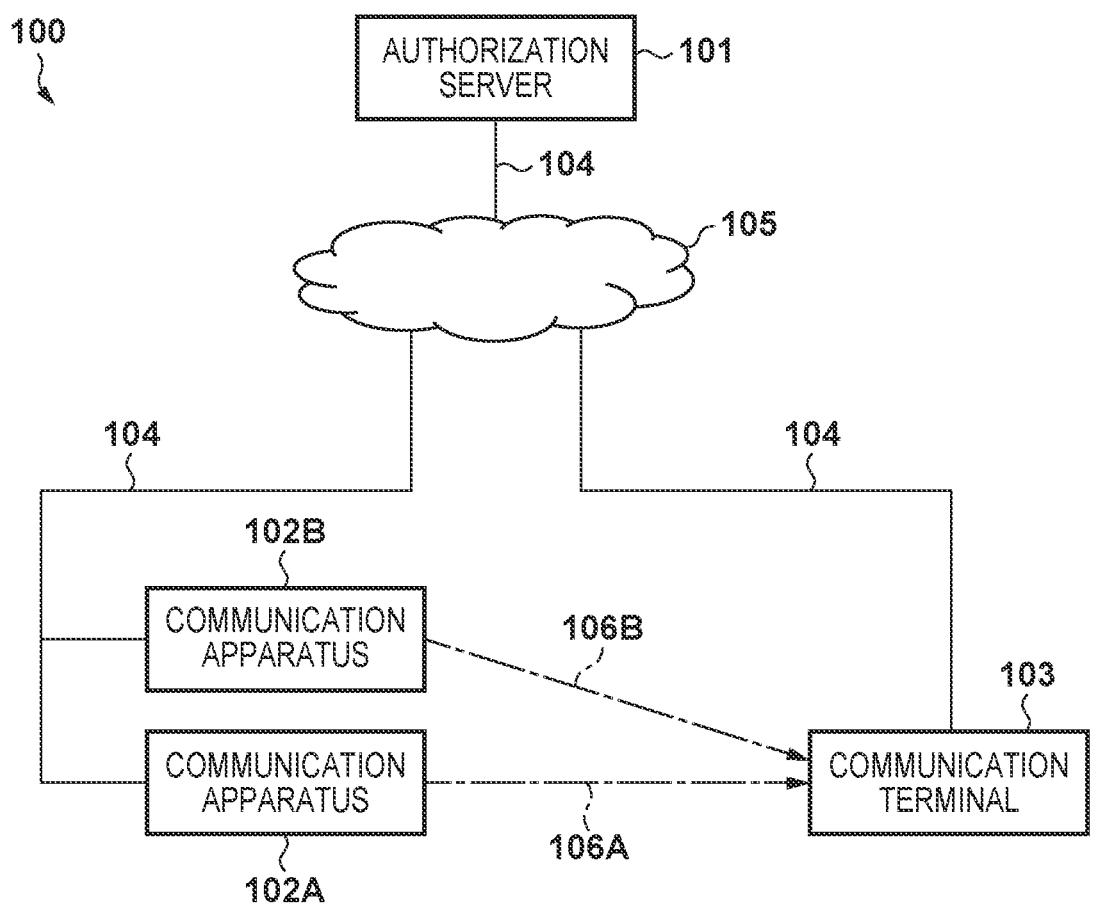
FIG. 1 illustrates an overall configuration of a communication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An example of an authorization server allocating, to a communication apparatus, access authority to access resources will be described as an example of the management apparatus according to the present embodiment.

System Configuration

FIG. 1 is a diagram illustrating an overall configuration of a communication system 100. The communication system includes an authorization server 101, a communication apparatus 102, and a communication terminal 103 that are configured to communicate with one another via a wide area network (WAN) 105 and a local area network (LAN) 104 used as networks.

The authorization server 101 is a server configured to issue access tokens. In this case, the access token is authorization information indicating access authority to access a resource and is, for example, a character strings composed of random alphanumeric characters. However, no such limitation is intended. The communication apparatus 102 is an apparatus configured to acquire an access token. FIG. 1 illustrates two communication apparatuses 102. However, three or more communication apparatuses may be present. The communication terminal 103 is a terminal configured to be operated by a user authorized to issue access tokens. Hereinafter, the user authorized to issue access tokens is referred to as a verifying person.

The LAN 104 is a wireless LAN conforming to the IEEE 802.11 standard series. However, any other wireless medium may be used, for example, wireless USB, MBOA, Bluetooth, UWB, or ZigBee. Additionally, a wired communication medium such as wired LAN may be used rather than a wireless medium. The WAN 105 may be another network such as a LAN.

As discussed above, the authorization server 101 and communication apparatus 102 are connected via the LAN 104 and the WAN 105. Additionally, the authorization server 101 and the communication terminal 103 are connected via the LAN 104 and the WAN 105. Note that the communication apparatus 102 and the communication terminal 103 are not limited to the illustrated connection and may be directly connected to the authorization server 101 via the WAN 105.

Additionally, the communication apparatus 102 and the communication terminal 103 are connected using short-range wireless communication 106. The short-range wireless communication 106 is, for example, Bluetooth (trade name) Low Energy (BLE) but may be any other short-range wireless communication. Additionally, the short-range wireless communication 106 may be data transmission using optical wireless communication or two-dimensional code, but no such limitation is intended. In the following description, the short-range wireless communication 106 is assumed as BLE.

Note that the communication apparatus 102 is, for example, a digital camera, but may be an apparatus, which have a function to connect to a network, such as a mobile phone, a smart phone, a notebook, a tablet terminal, or any other apparatus. The communication terminal 103 is a smart phone, for example, but may be an apparatus which has a function to connect to a network, such as a digital camera, a mobile phone, a notebook PC, a tablet terminal, or any other apparatus.

Hardware Configuration of Each Apparatus

Figure 2:
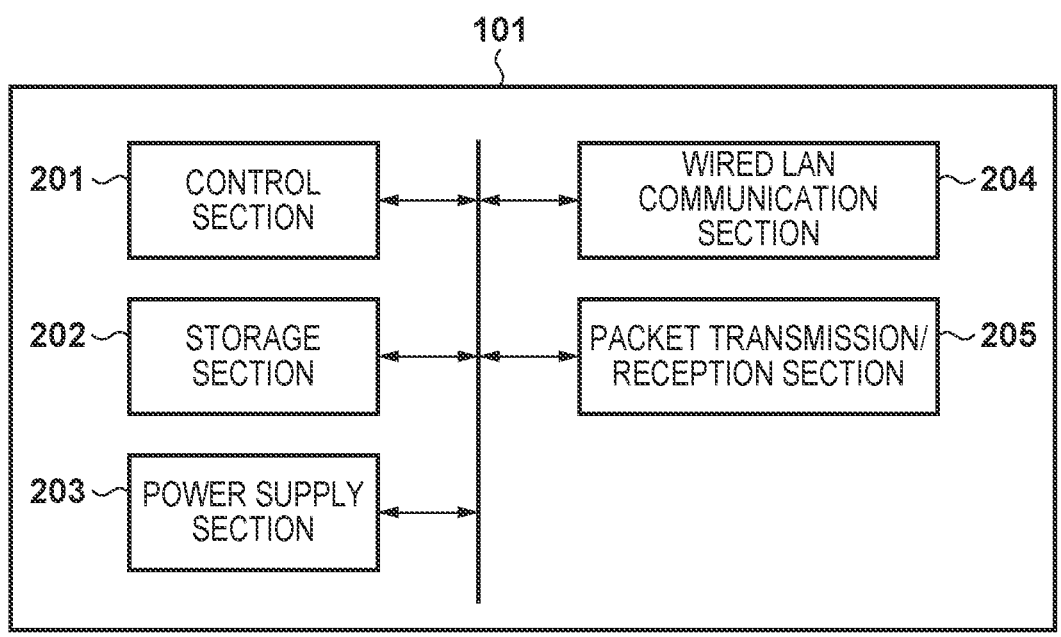
FIG. 2 is a diagram illustrating a hardware configuration of an authorization server.

FIG. 2 is a diagram illustrating a hardware configuration of the authorization server 101. The authorization server 101 includes, for example, a control section 201, a storage section 202, a power supply section 203, a wired LAN communication section 204, and a packet transmission/reception section 205.

The control section 201 is configured to control the authorization server 101 by executing a control program stored in the storage section 202. The storage section 202 is configured to store control programs to be executed by the control section 201, and various information described below. Various operations in the authorization server 101 described below may be performed when the control section 201 executes the control programs stored in the storage section 202. For example, with regard to a hardware configuration, the control section 201 and the storage section 202 are respectively configured to include one or more processors such as a CPU and an MPU; and one or more memories such as a ROM and a RAM. Here, CPU is an acronym for Central Processing Unit, and MPU is an acronym for Micro Processing Unit. Additionally, ROM is an acronym for Read Only Memory, and RAM is an acronym for Random Access Memory. Additionally, at least some of the following function units may be implemented, for example, by the processor by reading programs stored by the storage device, and some of the function units may be implemented by another hardware.

The power supply section 203 is configured to supply power to the authorization server 101. The wired LAN communication section 204 is connected to a wired LAN and is configured to communicate with other apparatuses in the wired LAN based on communication control processing of the packet transmission/reception section 205. The packet transmission/reception section 205 is configured to transmit and receive packets related to various types of communication over the wired LAN.

Figure 3:
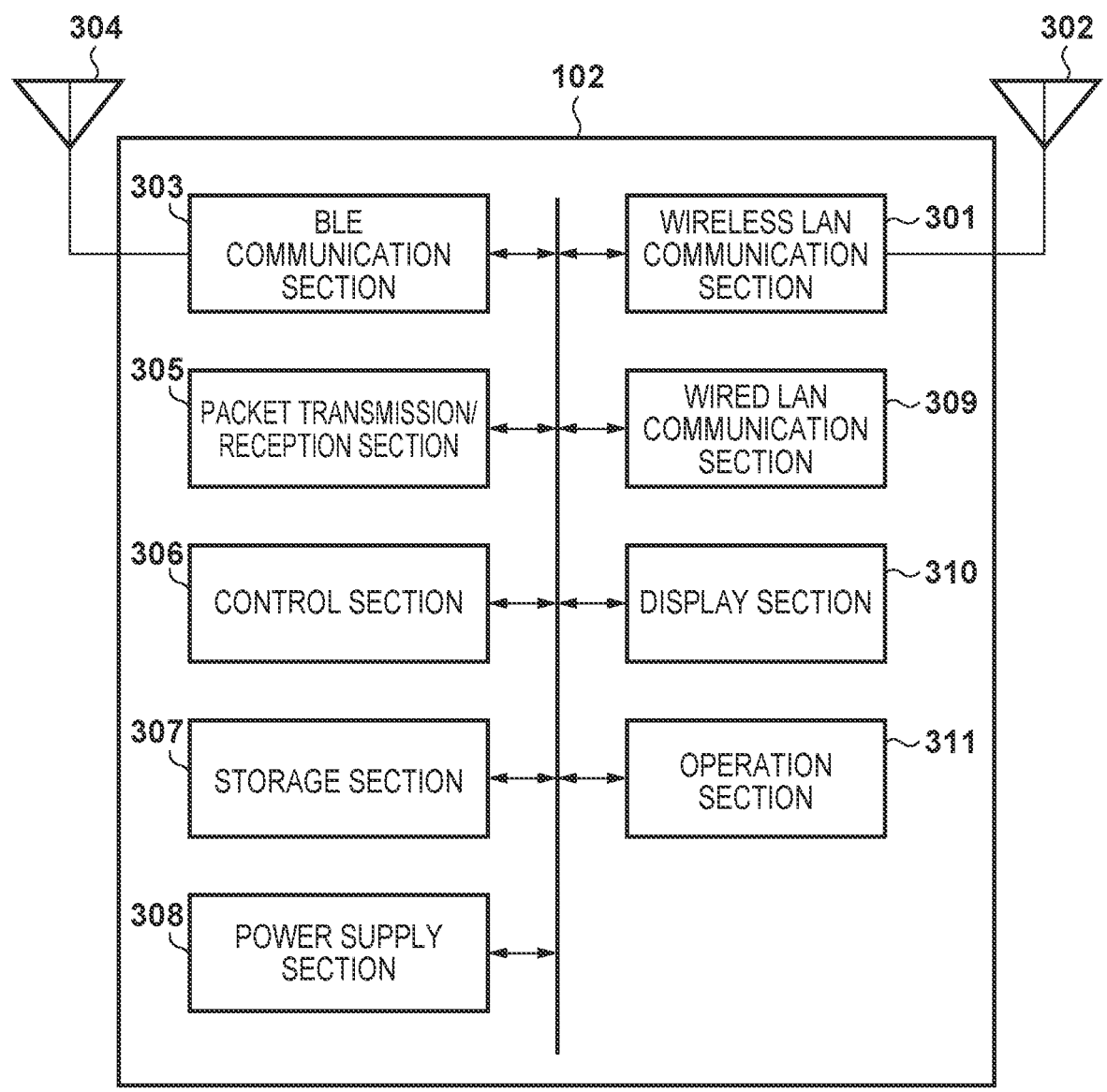
FIG. 3 is a diagram illustrating a hardware configuration of a communication apparatus.

FIG. 3 is a diagram illustrating a hardware configuration of the communication apparatus 102. The communication apparatus 102 includes, for example, a wireless LAN communication section 301, a BLE communication section 303, a packet transmission/reception section 305, a control section 306, a storage section 307, a power supply section 308, a wired LAN communication section 309, a display section 310, and an operation section 311.

The wireless LAN communication section 301 is configured to execute RF control, communication processing, and processing of drivers and related protocols that execute various types of control of communication compliant with the IEEE 802.11 series, for wireless LAN. The wireless LAN communication section 301 communicates in the wireless LAN via an antenna 302. The BLE communication section 303 is configured to execute RF control, communication processing, and processing of drivers and related protocols that execute various types of control of communication compliant with BLE standards, for BLE. The BLE communication section 303 communicates via an antenna 304. The packet transmission/reception section 305 is configured to transmit and receive packets related to various types of communication.

The control section 306 is configured to execute control programs stored in the storage section 307 to control the communication apparatus 102. The storage section 307 is configured to store the control program executed by the control section 306, and various types of information such as parameters required for communication. Various operations of the communication apparatus 102 described below can be performed by the control section 306 by executing the control programs stored in the storage section 307. The power supply section 308 is configured to supply power to the communication apparatus 102. The display section 309 is a function unit configured to display various types of display and configured to output visibly recognizable information from an LCD or LEDs or audio output from a speaker or the like. The operation section 310 is configured to accept an operation on the communication apparatus 102.

Figure 4:
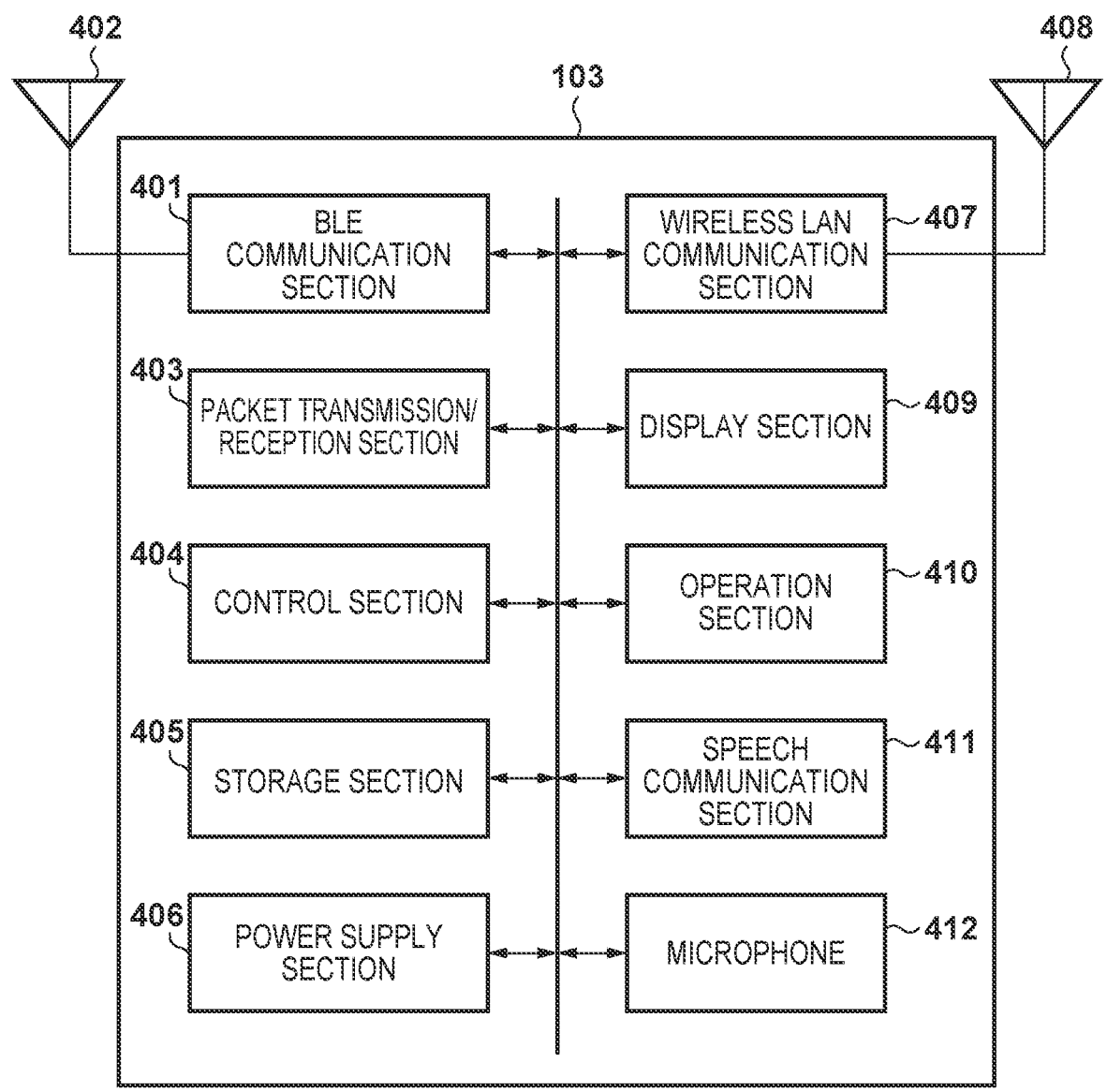
FIG. 4 is a diagram illustrating a hardware configuration of a communication terminal.

FIG. 4 is a diagram illustrating a hardware configuration of the communication terminal 103. The communication terminal 103 includes, for example, a BLE communication section 401, a packet transmission/reception section 403, a control section 404, a storage section 405, a power supply section 406, a wireless LAN communication section 407, a display section 409, an operation section 410, a speech communication section 411, and a microphone 412.

The BLE communication section 401 is configured to execute RF control, communication processing, and processing of drivers and related protocols that execute various types of control of communication compliant with BLE standards, for BLE. The BLE Communication section 401 is configured to communicate via an antenna 402. The packet transmission/reception section 403 is configured to transmit and receive packets related to various types of communication.

The control section 404 is configured to execute control programs stored in the storage section 405 to control the communication terminal 103. The storage section 405 is configured to store the control program executed by the control section 404, and various types of information such as parameters required for communication. Various operations in the communication terminal 103 described below are performed by the control section 404 by executing the control programs stored in the storage section 405. For example, with regard to hardware configuration, the control section 404 and the storage section 405 are respectively configured to include one or more processors such as a CPU and an MPU; and one or more memories such as a ROM and a RAM. The power supply section 406 is configured to supply power to the communication terminal 103. The wireless LAN communication section 407 is configured to execute RF control and communication processing, and processing of drivers and related protocols that execute various types of control of communication compliant with the IEEE 802.11 series, for wireless LAN. The wireless LAN communication section 407 communicates in the wireless LAN via an antenna 408. The display section 409 is a function unit configured to display various types of display and configured to output visibly recognizable information from an LCD or LEDs or audio output from a speaker or the like. The operation section 410 is configured to accept operations on the communication terminal 103. The speech communication section 411 is configured to provide a communications function to a user via the microphone 412.

Note that the functional blocks of each of the above-described apparatuses are mere examples. Additionally, a plurality of functional blocks may be configured into one functional block, or any of the functional blocks may be further divided into blocks performing a plurality of functions.

Software Configuration of Each Apparatus

Figure 5A:
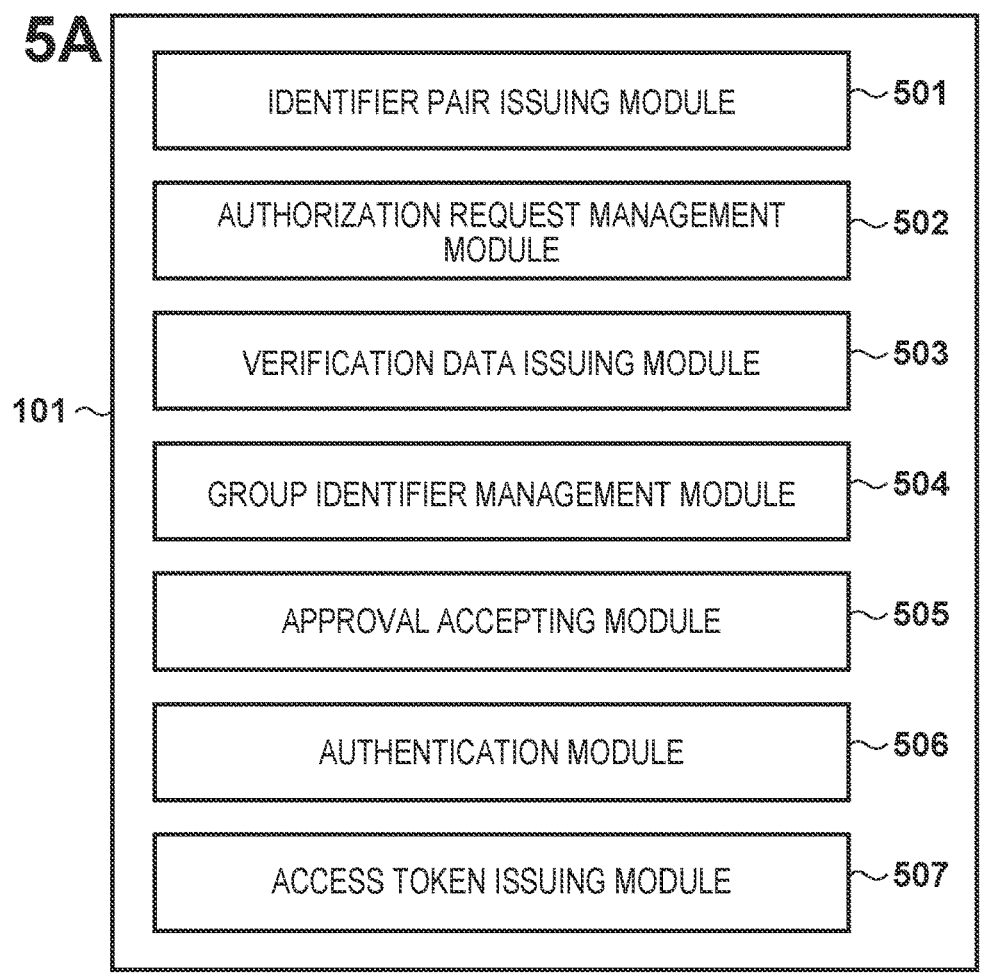
FIGS. 5A to 5C illustrate a software configuration of each apparatus.
Figure 5B:
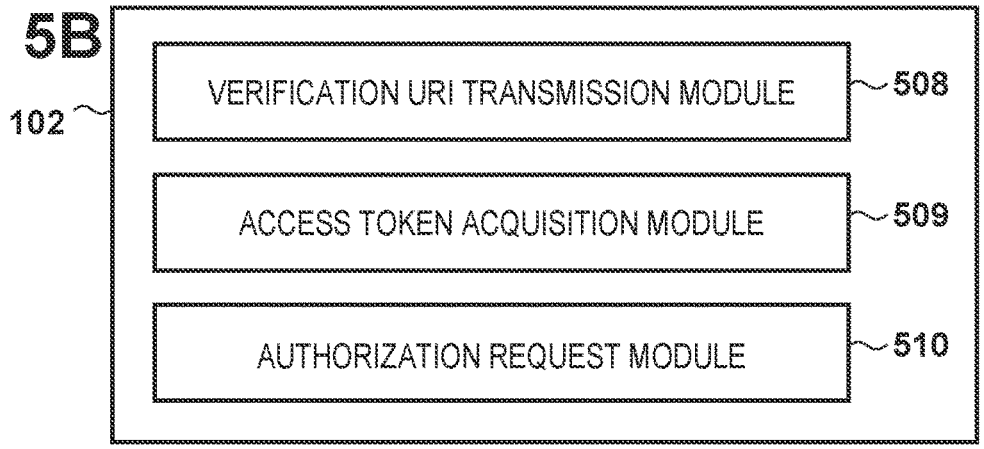
Figure 5C:
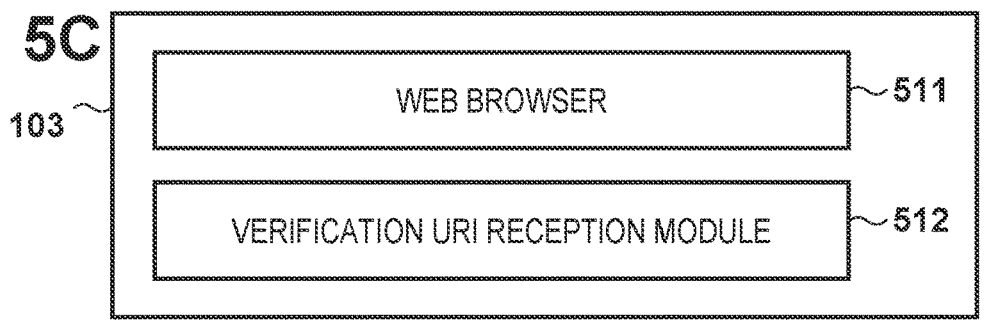

FIGS. 5A to 5C are diagrams illustrating software configurations of each apparatus (the authorization server 101, the communication apparatus 102, and the communication terminal 103). The figures illustrate only the software configurations relating to processing for issuance of access tokens by the authorization server 101 to a communication apparatus 102 requesting an authorization request, as described below. FIG. 5A illustrates a software configuration of the authorization server 101, FIG. 5B illustrates a software configuration of the communication apparatus 102, and FIG. 5C illustrates a software configuration of the communication terminal 103.

The authorization server 101 includes an identifier pair issuing module 501, an authorization request management module 502, a verification data issuing module 503, and a group identifier management module 504. The authorization server 101 further includes an approval accepting module 505, an authentication module 506, and an access token issuing module 507. The communication apparatus 102 includes a verification URI transmission module 508, an access token acquisition module 509, and an authorization request module 510. The communication terminal 103 includes a web browser 511 and a verification URI reception module 512. Here, URI is an acronym for Uniform Resource Identifier, which is information indicating a location on the network. Details of processing executed by each of the modules will be described below with reference to FIGS. 7 to 10.

System Operations

Operations of the communication system will be described with reference to flowcharts in FIGS. 7 to 10. In particular, various processes executed by the authorization server 101 will be mainly described.

Figure 7:
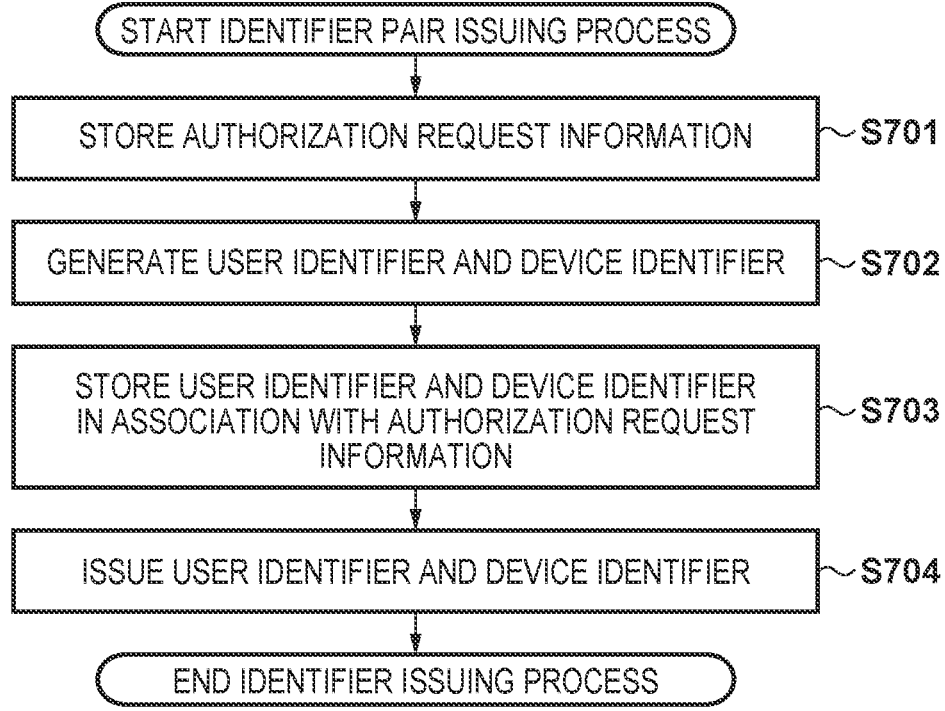
FIG. 7 is a flowchart of an identifier pair issuing process.

FIG. 7 is a flowchart of an identifier pair issuing process 700. The identifier pair issuing process 700 is a process for issuing a pair of a user identifier and a device identifier (identifier pair) to the communication apparatus 102 in response to an authorization request from the communication apparatus 102. The identifier pair issuing process 700 is started by the authorization server 101 by launching the identifier pair issuing module 501 using reception of an authorization request as a trigger.

The authorization request is a message that the communication apparatus 102 transmits to the authorization server 101 to request the start of authorization acquisition and includes authorization request information. The authorization request information is, for example, an identifier for identifying an authorization requesting person or authority range information indicating the range of access authority requested. However, no such limitation is intended. For example, the authorization request information may include other information such as the name of the communication apparatus 102 and an icon image. Additionally, the identifier for identifying the authorization requesting person is a unique identifier generated in the authorization server 101 in advance and registered with the communication apparatus 102. In a case where the identifier pair issuing process 700 is started, the identifier pair issuing module 501 executes S701.

In a step S701, the identifier pair issuing module 501 stores, in the authorization request management module 502, the authorization request information included in the authorization request. In a step S702, the identifier pair issuing module 501 generates a user identifier and a device identifier. The user identifier and the device identifier are unique values on the authorization server and are character strings expressed in a list of arbitrary alphanumerics. The user identifier is information representing authority for providing an approval instruction and is an identifier transmitted from the communication terminal 103 to the authorization server. The device identifier is information representing authority for acquiring an access token and is an identifier transmitted from the communication apparatus 102 to the authorization server 101. Note that an expiration date and the number of times of utilization may be set for the user identifier and the device identifier separately. In a step S703, the identifier pair issuing module 501 uses the authorization request management module 502 to store the user identifier and the device identifier generated in S702 in the authorization request table shown in FIG. 12 in association with the received authorization request information. In a step S704, the identifier pair issuing module 501 transmits (issues) a pair of a user identifier and a device identifier to the communication apparatus 102.

FIG. 12 is a diagram illustrating an example of an authorization request table. The authorization request table is composed of, for example, the authorization requesting person, the authorization request range, the device identifier, the user identifier, an access token issuance authorization. The authorization requesting person and the authorization request range are information included in the authorization request information. The item of authorization requesting person stores the identifier for identifying the authorization requesting person. Additionally, the item of authorization request range stores the range of the access authority that the communication apparatus 102 requests from the authorization server. The item of access token issuance authorization stores information of whether access token issuance by the device identifier is authorized.

Figure 8:
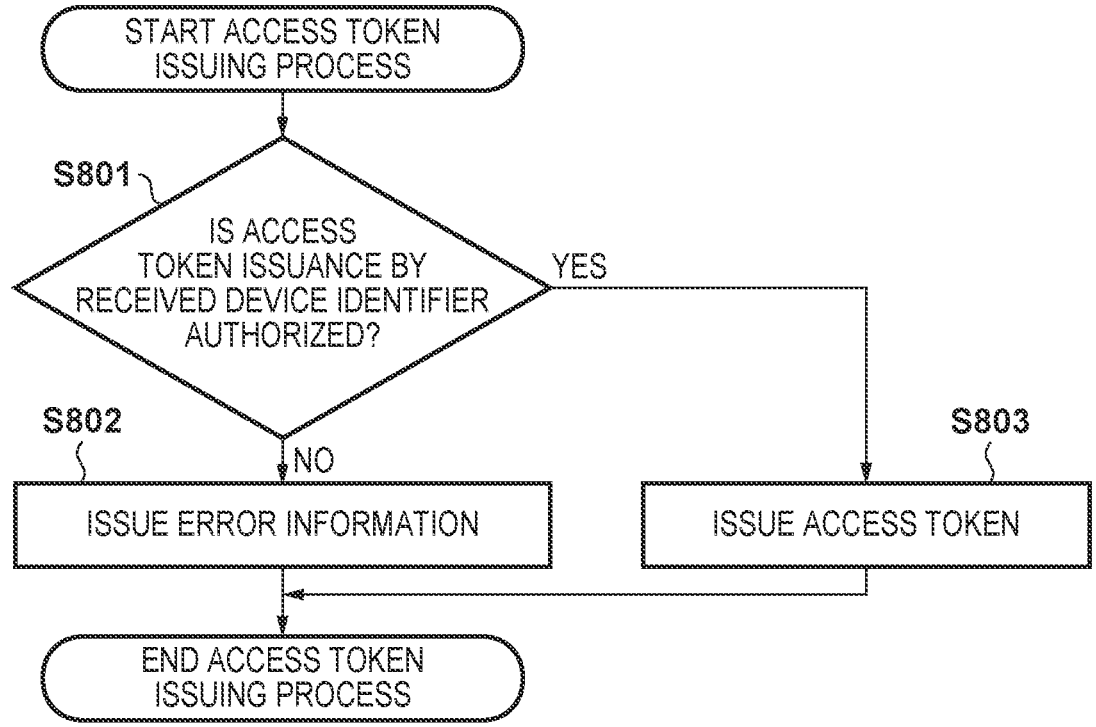
FIG. 8 is a flowchart of an access token issuing process.

FIG. 8 is a flowchart of an access token issuing process 800. The access token issuing process 800 is a process in which the authorization server 101 issues an access token to the communication apparatus 102 in response to the access token acquisition request from the communication apparatus 102. The access token issuing process 800 is performed by the authorization server 101 by launching the access token issuing module 507 using reception of the access toke acquisition request as a trigger.

The access token acquisition request is a message that the communication apparatus 102 requests to acquire the access token and is transmitted from the communication apparatus 102 to the authorization server 101. The access token acquisition request includes the device identifier issued in the identifier pair issuing process 700. However, no such limitation is intended. For example, the access token acquisition request may include information for identifying a sender of the access token acquisition request. In a case where the access token issuing process 800 is started, the access token issuing module 507 executes S801.

In a step S801, the access token issuing module 507 uses the authorization request management module 502 to determine whether the access token issuance by the device identifier received in the access token acquisition request is authorized. In a case where the authorization request management module 502 determines that the access token issuance is authorized, the process is transitioned into S803. In a case where the authorization request management module 502 determines that the access token issuance is not authorized, the process is transitioned into S802. In a step S802, the access token issuing module 507 generates error information and ends the access token issuing process. Note that the error information is, for example, information notifying that the access token issuance is not authorized, but no such limitation is intended. In a step S803, the access token issuing module 507 generates an access token and ends the access token issuing process.

FIG. 9 is a flowchart of a verification data issuing process 900. The verification data issuing process 900 is a process in which the authorization server 101 issues verification data to the communication terminal 103 in response to a verification start request from the communication terminal 103. The verification data issuing process 900 is executed by the authorization server 101 launching the verification data issuing module 503 using reception of the verification start request as a trigger.

The verification start request is a message for requesting start of an operation on the communication terminal 103 for authorizing or rejecting access token acquisition by the communication apparatus 102. The verification start request is a message transmitted from the communication terminal 103 to the authorization server 101. Note that the verification start request includes a group identifier and a user identifier, but no such limitation is intended. For example, the verification start request may include only the user identifier. Alternatively, the verification start request may include two or more user identifiers. This allows a plurality of user identifiers to be stored in association with the group identifier using one verification start request, and the number of messages to be received can be reduced.

In this case, it is assumed that information for checking the user ID of a verifying person is utilized as a group identifier, but no such limitation is intended. For example, an arbitrary value issued by the authorization server 101, the communication apparatus 102, or the communication terminal 103 may be used as a group identifier. Additionally, the information for checking the user ID of the verifying person is assumed to be a cookie stored as information representing a login state of the verification person. However, no such limitation is intended. For example, the information for checking the user ID of the verifying person may be an ID or a password for user authentication or other credential information may be used. The cookie is a session number provided after completion of login.

The authorization server 101 uses reception of a verification start request as a trigger to launch the verification data issuing module 503 to execute the verification data issuing process 900. Once the verification data issuing process 900 is started, the verification data issuing module 503 uses the authentication module 506 to execute S901.

In a step S901, the authentication module 506 determines whether the authentication of the verifying person corresponding to the transmitting source of the verification start request is completed. In this case, the determination whether authentication of the verifying person is completed is performed by verifying the cookie received in the verification start request and checking whether user login has been completed. In a case where the authentication module 506 determines that the authentication is not complete, then the process is transitioned to S902. In a case where the authentication module 506 determines that the authentication is completed, then the process is transitioned to S903.

In a step S902, the authentication module 506 authenticates the verifying person. Verification of the verifying person is assumed to be performed by transmitting, to the authentication module 506, the ID and password of the verifying person input by the user on the web browser 511 and verifying the validity of the ID and the password. However, no such limitation is intended. For example, the authentication may be achieved by transmitting, to the authentication module 506, a client certificate stored in the web browser 511 in advance and verifying the validity of the client certificate. In a case of completing the authentication of the verifying person, the authentication module 506 transmits the cookie to the web browser 511.

In a step S903, the verification data issuing module 503 utilizes the group identifier management module 504 to store the user identifier, received in the verification start request, in the grouping table in association with the group identifier.

FIG. 13 is a diagram illustrating an example of a grouping table. In this case, the grouping table is constituted of, for example, the items of group identifier and user identifier. Note that in the group identifier management module 504 performing group storage and management, an upper limit may be imposed on the number of user identifiers associated with one group identifier. In a case where the number of user identifiers reaches the upper limit, the group identifier management module 504 transmits, to the web browser 511, a message indicating that the upper limit has been reached, by the message being included in the verification data described below. For example, according to a security policy of the authorization server 101, in a case where an upper limit is imposed on the number of communication apparatuses that can be authorized in a single authorization operation by the verifying person, unnecessary authorization operations performed by the verifying person can be reduced by transmitting the message indicating that the upper limit has been reached.

In a step S904, the verification data issuing module 503 uses the group identifier management module 504 to search for the user identifier associated with the same group identifier as the received group identifier. In this case, the search for the user identifier is performed by searching the grouping table stored in the group identifier management module 504, for the user identifier associated with the same group identifier as the received group identifier.

In a step S905, the verification data issuing module 503 uses the authorization request management module 502 to search for authorization request information associated with the user identifier obtained at S904. In this case, the search for the authorization request information is performed by searching an authorization request table stored in the authorization request management module, for information associated with the user identifier obtained.

In a step S906, the verification data issuing module 503 generates verification data based on the user identifier obtained at S904 and the authorization request information obtained at S905. In this case, the verification data includes an authorization URI for authorizing the access token acquisition by the device identifier paired with all the user identifiers associated with the group identifier; and the authorization request information. For example, the verification data may include a URI for rejecting the access token acquisition by the device identifier paired with all the user identifiers associated with the group identifier. Additionally, the verification data may include data for the verifying person to select a particular communication apparatus. This allows the verifying person to perform a single authorization operation to exclude a particular communication apparatus from targets to be authorized or to designate a particular communication apparatus as a target to be authorized. Furthermore, the verification data may include a URI invoking the verification URI reception module 512 in the communication terminal 103. For example, in a case where the verification URI reception module 512 is a QR code (trade name) reader, the verifying person needs to manually switch, at the communication terminal 103, the operation from the web browser to the QR code reader. In contrast, addition, to the verification data, of the URI invoking the verification URI reception module 512 allows the verifying person to switch to the QR code reader by a simple operation on the web browser.

In a step S907, the verification data issuing module 503 transmits (issues) the generated verification data to the communication terminal 103.

FIG. 10 is a flowchart of an approval accepting process 1000. The approval accepting process 1000 is a process in which the authorization server 101 accepts authorization approval in response to access to the authorization URI by the communication terminal 103. The approval accepting process 1000 is executed by the authorization server 101 by launching the approval accepting module 505 using the access to the authorization URI as a trigger.

The authorization server receives the group identifier and the selection information from the communication terminal 103 by accessing the authorization URI. In this case, the selection information is information for identifying the communication apparatus for which the verifying person has approved authorization. The selection information is a user identifier. However, no such limitation is intended. For example, the selection information may be an identifier representing authorization and rejection. The selection information is a user identifier issued for a communication apparatus for which authorization is rejected. However, no such limitation is intended. For example, the selection information may be a user identifier issued for a communication apparatus for which authorization is authorized or may include information representing whether to authorize or reject authorization such that the number of pieces of information is equal to the number of communication apparatuses.

In a step S1001, the approval accepting module 505 uses the authentication module 506 to determine the user ID based on the cookie included in the access to the authorization URI. In a step S1002, the approval accepting module 505 uses the group identifier management module 504 to search for all the user identifiers associated with the user ID of the verifying person stored in the grouping table. In a step S1003, the approval accepting module 505 repeats S1004 and S1005 for all the user identifiers acquired in step 1002.

In a step S1004, the approval accepting module 505 determines, based on the selection information received by the access to the authorization URI, whether the access token acquisition by the device identifier paired with the user identifier is authorized. In this case, the description assumes that the authorization server 101 receives, as the selection information, information identifying a rejected communication apparatus. The approval accepting module 505 checks whether the same user identifier as the user identifier to be processed has been received as the selection information. In a case where the same user identifier has been received as the selection information, the approval accepting module 505 determines that the access token acquisition by the device identifier paired with the user identifier has not been authorized. On the other hand, in a case where the same user identifier has not been received as the selection information, the approval accepting module 505 determines that the access token acquisition by the device identifier paired with the user identifier has been authorized. At S1004, in a case where the approval accepting module 505 determines that the access token acquisition by the device identifier paired with the user identifier has been authorized, the process is transitioned to S1005. In a case where the approval accepting module 505 determines that the access token acquisition has not been authorized, the process is transitioned to S1006.

In a step S1005, the approval accepting module 505 uses the authorization request management module 502 to set, in the authorization request table, the access token acquisition by the device identifier paired with the user identifier in the authorization request table to an authorized state.

In a step S1006, in a case where processing on all of the acquired user identifiers is completed, the approval accepting module 505 ends the approval accepting process. Otherwise, in a case where processing on all of the acquired user identifiers is not completed, the process returns to S1003, where processing on other user identifiers is executed.

Note that, in the above description, in a case where the approval accepting module 505 determines that the access token acquisition has not been authorized in S1004, the process proceeds to S1006, but the user identifier and the device identifier may be deleted from the authorization request management module 502. This can reduce memory capacity utilized by the authorization request management module.

Example of Processing

FIGS. 6A and 6B are a sequence diagram illustrating an example of processing related to issuance of an access token. In the present example of processing, two communication apparatuses 102 (communication apparatuses 102A and 102B) request authorization from the authorization server 101. Then, the verifying person uses the communication terminal 103 to access the authorization URI issued by the authorization server 101. Subsequently, the authorization server 101 authorizes access token issuance to the communication apparatuses 102A and 102B based on the access to the authorization URI.

The communication apparatus 102A transmits, to the authorization server 101, an authorization request 601, which is a request for authorization. Note that the authorization request 601 is transmitted using, as a trigger, an input operation for the communication apparatus 102A by the user, but no such limitation is intended. For example, the transmission of the authorization request 601 may also be started in a case where a predetermined BLE signal is received from the communication terminal 103 or a case where a signal is received from another communication apparatus.

In a case of receiving the authorization request 601, the authorization server 101 launches the identifier pair issuing module 501 to start the identifier pair issuing process 700.

In a case of ending the identifier pair issuing process 700, the authorization server 101 transmits, to the communication apparatus 102A, an authorization response 602, which is a response for authorization. In this case, the authorization response includes the device identifier and user identifier issued by the identifier issuing process. However, no such limitation is intended. For example, the authorization response may include other information such as the expiration date of the user identifier or the expiration date of the device identifier. Note that, in this case, the communication apparatus 102A is assumed to have transmitted "Camera001" and "Upload Browse" to the authorization server 101 as authorization request information. Additionally, the authorization server 101 is assumed to have transmitted "DeviceCode001" and "UserCode001" to the communication apparatus 102A as a device identifier and a user identifier.

Additionally, the communication apparatus 102B transmits an authorization request 603 to the authorization server 101. In a case of receiving the authorization request 603, the authorization server 101 starts the identifier pair issuing process 700.

In a case of ending the identifier pair issuing process 700, the authorization server 101 transmits, to the communication apparatus 102B, an authorization response 604 including the device identifier and the user identifier. Note that, in this case, the communication apparatus 102B is assumed to have transmitted "Camera002" and "Upload" to the authorization server 101 as authorization request information. Additionally, the authorization server 101 is assumed to have transmitted "DeviceCode002" and "UserCode002" to the communication apparatus 102B as a device identifier and a user identifier.

FIG. 12 is a diagram illustrating an example of the authorization request table stored in an authorization request management module. Specifically, FIG. 12 illustrates a state immediately after issuance of an identifier pair for each of the communication apparatus 102A and the communication apparatus 102B described above.

Then, the communication apparatus 102A transmits an access token acquisition request 605 to the authorization server 101. The access token acquisition request 605 includes a device identifier received in the authorization response 602 by the communication apparatus 102A. Note that the access token acquisition request 605 is transmitted by the communication apparatus 102A launching the access token acquisition module 509 using, as a trigger, reception of the authorization response 602 by the communication apparatus 102A. Additionally, in this case, the communication apparatus 102A is assumed to transmit the access token acquisition request 605 every certain period until the access token acquisition is completed. However, no such limitation is intended. For example, the information may be transmitted even when a user input operation for the communication apparatus 102A or a predetermined BLE signal from the communication terminal 103 is received. In a case of receiving the access token acquisition request, the authorization server 101 launches the access token issuing module 507 and executes the access token issuing process 800.

At S801, the authorization request management module 502 references the item of access token issuance authorization corresponding to "DeviceCode001" in the stored authorization request table. The referenced access token issuance authorization has a value of "No," the authorization request management module determines that the access token issuance has not been authorized, and the process is transitioned to S802. At S802, the access token issuing module 507 issues error information. The authorization server 101 transmits an access token acquisition response 606 to the communication apparatus 102A. The access token acquisition response 606 includes error information.

Additionally, the communication apparatus 102B transmits an access token acquisition request 607 to the authorization server 101. Processing related to the access token acquisition request 607 is similar to the processing related to the access token acquisition request 605 described above and will thus not be described below.

The communication apparatus 102A transmits an operation transfer message 609 to the verification URI reception module 512 of the communication terminal 103. In this case, the operation transfer message 609 includes the user identifier and verification URI included in the authorization response 602 and is transmitted using the short-range wireless communication 106. Note that the operation transfer message 609 is transmitted by launching the verification URI transmission module 508 using reception of the authorization response 602 as a trigger, but no such limitation is intended. For example, the transmission of the operation transfer message 609 may also be started in a case where an input operation for the communication apparatus 102A by the user is received or a predetermined BLE signal is received from the communication terminal 103.

The communication terminal 103 transmits a verification start request 610, which is a verification request, from the verification URI reception module 512 to the authorization server 101 via the web browser 511. The verification start request 610 includes a user identifier transmitted to the communication apparatus 102A in the authorization response 602 by the authorization server 101. Additionally, the verification start request 610 is transmitted to the verification URI by the verification URI reception module 512, e.g., using reception of the operation transfer message 609 as a trigger. However, no such limitation is intended. For example, the number of the operation transfer messages received by the verification URI reception module 512 may be determined in advance, and for example, the operation transfer messages may be transmitted at a time when the number of received user identifiers reaches a prescribed value or may be transmitted using a user operation on the communication terminal 103 as a trigger.

The authorization server 101 launches the verification data issuing module 503 using reception of the verification start request 610 as a trigger and executes the verification data issuing process 900. The verification data issuing module 503 determines at S901 that the verifying person has not been authenticated, and the process is transitioned to S902. At S902, the authentication module 506 authenticates the authentication verifying person. Additionally, at S902, once the authentication of the verifying person is completed, the user ID is made known. Here, the user ID of the verifying person is assumed to be "UserA". The data issuing module executes S902 to S907 and issues verification data. Subsequently, the authorization server 101 transmits the verification data to the web browser 511 of the communication terminal 103.

Figure 11A:
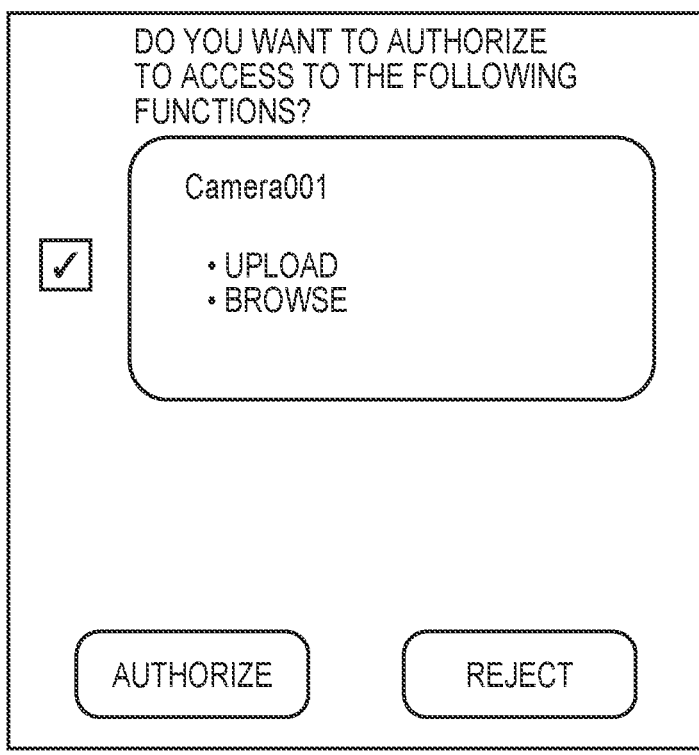
FIGS. 11A and 11B are diagrams illustrating examples of an approval request screen.
Figure 11B:
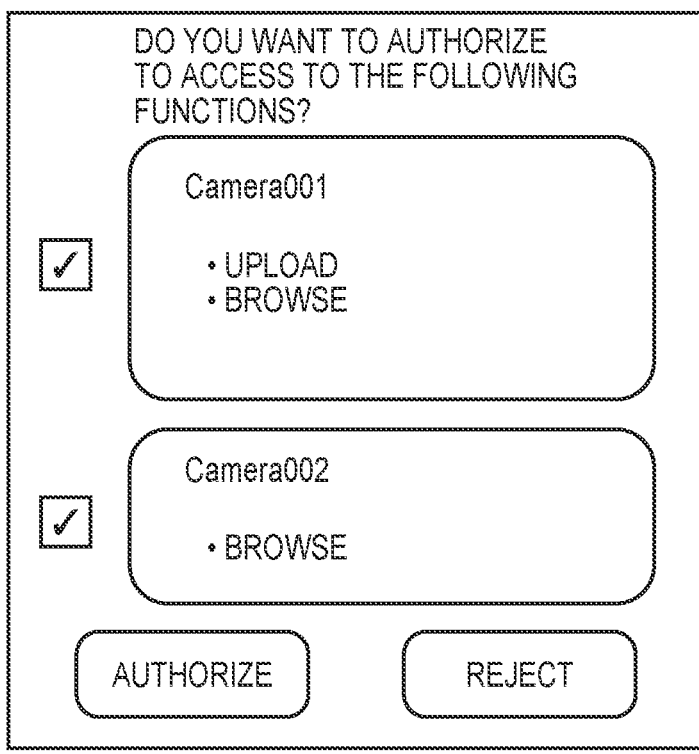

In a case of receiving the verification data, the web browser 511 displays an approval request screen 1101 based on the verification data. FIGS. 11A and 11B are diagrams illustrating examples of an approval request screen. The approval request screen 1101 illustrated in FIG. 11A is a screen specifying an approval related to the communication apparatus 102A. The approval request screen 1101 includes, for example, a checkbox for selecting an authorization requesting person to obtain an authorization, information about authorization requesting persons, a button for approving authorization, a button for rejecting authorization, and the like. The verifying person may exclude a particular communication apparatus from the approval targets by unchecking the checkbox. Here, the description is continued on the assumption that the user has performed no operation on the authorization URI (i.e., performed no button operation of authorization or rejection for authorization) in the approval request screen.

The communication apparatus 102B transmits an operation transfer message 612 to the verification URI reception module 512. The operation transfer message 612 includes the user identifier and verification URI transmitted to the communication apparatus 102B in the authorization response 604 by the authorization server 101. The verification URI reception module 512 transmits a verification start request 613 to the authorization server 101 via the web browser 511 using reception of the operation transfer message 612 as a trigger. The verification start request 613 includes the user identifier transmitted to the communication apparatus 102B in the authorization response 604 by the authorization server and the cookie issued at S902. The authorization server 101 launches the verification data issuing module 503 using reception of the verification start request 613 as a trigger and executes the verification data issuing process 900. The verification data issuing module 503 determines at S901 that the authentication of the verifying person has been finished based on the cookie received in the verification start request 613, and the process is transitioned to S903. The verification data issuing module 503 executes S903 to S906 and issues verification data.

FIG. 13 is a diagram illustrating an example of the grouping table stored in the group identifier management module 504. Specifically, FIG. 13 illustrates the state immediately after issuance, to the communication terminal 103 (web browser 511), of the verification data for each of the communication apparatus 102A and communication apparatus 102B described above. The authorization server 101 transmits verification data 614 to the web browser 511.

Web browser 511 displays an approval request screen 1102 based on the verification data 614 using reception of the verification data 614 as a trigger. The approval request screen 1102 illustrated in FIG. 11B is a screen enabling the approval related to the communication apparatus 102A and the communication apparatus 102B to be collectively specified. The approval request screen 1102 includes list display of information related to a plurality of authorization requests, a check box corresponding to information related to each authorization request, a button for approving the authorization, and a button for rejecting the authorization. The information related to the authorization request includes the identifier of the communication apparatus requesting authorization and the authorization request information. Thus, the user presses the authorization button to allow the authorization server 101 to collectively allocate authorization to the communication apparatus 102A and communication apparatus 102B. Additionally, by selecting the desired communication apparatus (checking the checkbox), the user can exclude or add the selected communication apparatus from and to the access authority allocation targets. Now, the description will be provided on the assumption that the access authority is authorized for both the communication apparatus 102A and the communication apparatus 102B.

The web browser 511 performs access 615 to the authorization URI on the authorization server 101. The access 615 to the authorization URI is performed, for example, by the verifying person depressing a button for approving the authorization on the web browser 511. The access 615 to the authorization URI includes, for example, a group identifier and selection information for identifying an approval target for authorization. The selection information is a user identifier issued for a communication apparatus for which authorization is to be rejected.

The authorization server 101 launches the approval accepting module 505 using, as a trigger, acceptance of the access 615 to the authorization URI and executes the approval accepting process 1000. The approval accepting module 505 executes S1001, and the process is transitioned to S1002. At S1002, the approval accepting module 505 acquires "UserCode001" and "UserCode002" as a processing result.

At S1003, the approval accepting module performs processing on "UserCode001" and "UserCode002." In a case where no selection information is included in the access 615 to the authorization URI, the process is transitioned to S1005 for the user identifier "UserCode001". For the user identifier "UserCode001", the authorization request management module changes, to "Yes", the authorization for access token issuance corresponding to the "UserCode001" in the authorization request table. Also for "UserCode002", the authorization request management module executes the processing at S1005 as is the case with "UserCode001".

In a case where the processing on "UserCode001" and "UserCode002" is completed, the approval accepting module ends the approval accepting process. The authorization server 101 transmits a completion notification 616 to the web browser 511. The completion notification 616 includes information for notifying the verifying person that the approval is completed.

The communication apparatus 102A transmits, to the authorization server 101, an access token acquisition request 617, which is a request for access token acquisition. In the access token issuing process for the access token acquisition request 617, at S801, the access token issuance by "DeviceCode001" determined to have been authorized. At S803, the access token issuing module 507 issues an access token to the communication apparatus 102A. The authorization server transmits an access token acquisition response 618 to the communication apparatus 102A. The access token acquisition response 618 includes the access token issued in the access token issuing process.

The communication apparatus 102B transmits an access token acquisition request 619 to the authorization server 101. In the access token issuing process for the access token acquisition request 619, at S801, the access token issuance by "DeviceCode002" determined to have been authorized. At S803, the access token issuing module 507 issues an access token to the communication apparatus 102B. The authorization server transmits an access token acquisition response 620 to the communication apparatus 102B. The access token acquisition response 620 includes the access token issued in the access token issuing process.

In this manner, the operator (verifying person) can specify, in a single authorization operation, authorization or rejection of access token issuance for the plurality of communication apparatuses 102. Note that, in a case where the operation on the group identifier such as the access to the authorization URI or the addition of the user identifier corresponding to the group identifier is not performed for a certain time, the corresponding group identifier and user identifier may be deleted from the group identifier management module. This enables a reduction in memory usage required for managing group identifiers.

As described above, according to the first embodiment, the authorization server 101 generates an authorization URI collectively authorizing allocation of the authorization information (access token) to the plurality of communication apparatuses 102 and transmits the authorization URI to the communication terminal 103. Then, the authorization server 101 determines the allocation of the authorization information to the plurality of communication apparatuses 102 based on the access to the authorization URI by the communication terminal 103. Thus, the operator (verifying person) of the communication terminal 103 can specify, in a single authorization operation, authorization or rejection of access token issuance for the plurality of communication apparatuses 102. That is, the number of instructions issued by the operator can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-012454, filed on Jan. 28, 2019, which is hereby incorporated by reference herein in its entirety.

What is claimed is:

1. A management apparatus managing access authority of a plurality of communication apparatuses to access a resource, the management apparatus comprising:
   one or more memories storing instructions; and
   one or more processors that execute the instructions to:
      receive an authorization request for the access authority from each of the plurality of communication apparatuses;
      transmit an authorization response generated based on information included in the received authorization request, the authorization response including a device identifier and a user identifier;
      receive a verification request including the user identifier from a communication terminal that has been notified of the user identifier from one communication apparatus, among the plurality of communication apparatuses, and that has obtained an operation transfer from the one communication apparatus;
      transmit verification data to the communication terminal as a response to the received verification request;
      accept access by the communication terminal based on the received verification data; and
      determine whether to permit or reject allocation of the access authority to the one communication apparatus based on the accepted access,
      wherein, in a case where a plurality of verification requests for multiple communication apparatuses, including the one communication apparatus, among the plurality of communication apparatuses, are received from the communication terminal, the one or more processors transmit the verification data to the communication terminal, the verification data enabling collective instruction to allocate the access authority to the multiple communication apparatuses, and
      wherein the one or more processors determine whether to permit or reject allocation of the access authority to each of one or more of the plurality of communication apparatuses, in a case where the access by the communication terminal based on the verification data is accepted.

2. The management apparatus according to claim 1, wherein the one or more processors execute the instructions to:
   receive an access token acquisition request from the one communication apparatus, the access token acquisition request including the device identifier of the one communication apparatus; and
   transmit an access token to the one communication apparatus in a case where the access authority is allocated to the device identifier included in the access token acquisition request.

3. The management apparatus according to claim 1, wherein, in a case where the received plurality of verification requests from the communication terminal include user identifiers indicating an identical user, the transmitted verification data enables the collective instruction to allocate the access authority to the multiple communication apparatuses.

4. The management apparatus according to claim 3, wherein:
the received verification request includes one or more of the user identifiers, and
in a case where the received plurality of verification requests include an identical user identifier, the user identifiers included in the received plurality of verification requests are determined to indicate the identical user.

5. The management apparatus according to claim 3, further comprising:
a storing a group identifier grouping a plurality of the user identifiers, and
wherein the received verification request further includes the group identifier, and
wherein, in a case where the group identifiers included in the received plurality of verification requests are identical, the user identifiers included in the received plurality of verification requests are determined to indicate the identical user.

6. The management apparatus according to claim 5, wherein, in a case where a number of the user identifiers associated with the group identifier included in the received verification request reaches an upper limit, the transmitted verification data includes information indicating that the upper limit is reached.

7. The management apparatus according to claim 1, wherein the received authorization request includes authorization information including at least one of authority range information indicating a range of the access authority requested, an identifier identifying the communication apparatus, a name of the communication apparatus, or an icon image indicative of the communication apparatus.

8. The management apparatus according to claim 1, further comprising:
a storage storing the information included in the received authorization request and information included in the transmitted authorization response,
wherein the information included in the received authorization request being associated with the information included in the received authorization response.

9. The management apparatus according to claim 1, wherein the verification data includes information about one or more of the communication apparatuses, among the plurality of communication apparatuses, associated with the user identifiers included in an identical group of the user identifier included in the received verification request.

10. The management apparatus according to claim 1, wherein the received verification data includes a URI indicating a position in a network.

11. A method of controlling a management apparatus managing access authority of a plurality of communication apparatuses to access a resource, the method comprising:
receiving an authorization request for the access authority from each of the plurality of communication apparatuses;
transmitting an authorization response generated based on information included in the received authorization request, the authorization response including a device identifier and a user identifier;
receiving a verification request including the user identifier from a communication terminal that has been notified of the user identifier from one communication apparatus, among the plurality of communication apparatuses, and that has obtained an operation transfer from the one communication apparatus;
transmitting verification data to the communication terminal as a response to the received verification request;
accepting access by the communication terminal based on the received verification data; and
determining whether to permit or reject allocation of the access authority to the one communication apparatus based on acceptance of the accepted access,
wherein, in a case where a plurality of verification requests for multiple communication apparatuses, including the one communication apparatus, among the plurality of communication apparatuses, are received from the communication terminal, the transmitting of the verification data transmits the verification data to the communication terminal, the verification data enabling collective instruction to allocate the access authority to the multiple communication apparatuses, and
wherein the determining further determines whether to permit or reject allocation of the access authority to each of one or more of the plurality of communication apparatuses, in a case where the access by the communication terminal based on the verification data is accepted.

12. A non-transitory computer-readable recording medium storing a program executable by a computer to execute a method of controlling a management apparatus managing access authority of a plurality of communication apparatuses to access a resource, the method comprising:
receiving an authorization request for the access authority from each of the plurality of communication apparatuses;
transmitting an authorization response generated based on information included in the received authorization request, the authorization response including a device identifier and a user identifier;
receiving a verification request including the user identifier from a communication terminal that has been notified of the user identifier from one communication apparatus, among the plurality of communication apparatuses, and that has obtained an operation transfer from the one communication apparatus;
transmitting verification data to the communication terminal as a response to the received verification request;
accepting access by the communication terminal based on the received verification data; and
determining whether to permit or reject allocation of the access authority to the one communication apparatus based on acceptance of the accepted access,
wherein, in a case where a plurality of verification requests for multiple communication apparatuses, including the one communication apparatus, among the plurality of communication apparatuses, are received from the communication terminal, the transmitting of the verification data transmits the verification data to the communication terminal, the verification data enabling collective instruction to allocate the access authority to the multiple communication apparatuses, and
wherein the determining further determines whether to permit or reject allocation of the access authority to each of one or more of the plurality of communication apparatuses, in a case where the access by the communication terminal based on the verification data is accepted.

* * * * *